United States Patent
Sutherland et al.

(10) Patent No.: US 7,069,295 B2
(45) Date of Patent: Jun. 27, 2006

(54) PEER-TO-PEER ENTERPRISE STORAGE

(75) Inventors: Andrew Sutherland, Concord, MA (US); Michael Richard Klugerman, Belmont, MA (US); Donal O'Neill, Somerville, MA (US); Sandor Ludmann, Winchester, MA (US); Eli Zukovsky, Charlestown, MA (US)

(73) Assignee: The Escher Group, Ltd., Cambridge, MA (US)

( * ) Notice: Subject to any disclaimer, the term of this patent is extended or adjusted under 35 U.S.C. 154(b) by 494 days.

(21) Appl. No.: 10/075,710

(22) Filed: Feb. 14, 2002

(65) Prior Publication Data

US 2002/0114341 A1    Aug. 22, 2002

Related U.S. Application Data

(60) Provisional application No. 60/268,765, filed on Feb. 14, 2001.

(51) Int. Cl.
*G06F 15/173* (2006.01)
*G06F 12/00* (2006.01)

(52) U.S. Cl. .............. 709/203; 709/220; 709/226; 711/162

(58) Field of Classification Search .............. 711/4, 711/111, 112, 154, 202, 162; 709/213, 201, 709/245, 250, 226, 239, 203, 209, 220, 228, 709/211, 208
See application file for complete search history.

(56) References Cited

U.S. PATENT DOCUMENTS

| 5,475,834 A | 12/1995 | Anglin et al. |
| 5,673,382 A | 9/1997 | Cannon et al. |
| 5,806,065 A | 9/1998 | Lomet |
| 5,832,514 A | 11/1998 | Norin et al. |

(Continued)

OTHER PUBLICATIONS

"Cluster-based scalable network sevices", Armando Fox et al, ACM SIGOPS Operating Systems Review, Proceedings of the sixteenth ACM symposium on Operating systems principles, Oct. 1997.*

(Continued)

*Primary Examiner*—Pierre-Michel Bataille
(74) *Attorney, Agent, or Firm*—Cesari and McKenna, LLP

(57) ABSTRACT

A peer-to-peer storage system includes a storage coordinator that centrally manages distributed storage resources in accordance with system policies administered through a central administrative console. The storage resources, or "nodes," are otherwise unused portions of storage media, e.g., hard disks, that are included in the devices such as personal computers, workstations, laptops, file servers, and so forth, that are connected to a corporate computer network, and are thus otherwise available only individually to the respective devices. The storage coordinator assigns the nodes to various "replication groups" and allocates the storage resources on each of the nodes in a given group to maintaining dynamically replicated versions of the group files. The storage nodes in a given group perform dynamic file replication and synchronization operations by communicating directly, that is, peer-to-peer, using a message-based protocol. The storage coordinator also manages distributed searches of file content on the network by selecting one node from each group to search through the associated group files. The selected nodes report the search results back to the storage coordinator, which organizes the results and provides them to the user. Thereafter, in response to a request for various files by the user, the storage coordinator instructs the nodes that are near neighbors of the user to provide the requested files. The storage coordinator thus ensures that the amount of the network bandwidth consumed by the search operation is minimized.

32 Claims, 9 Drawing Sheets

U.S. PATENT DOCUMENTS

| | | | |
|---|---|---|---|
| 5,911,776 | A | 6/1999 | Guck |
| 5,913,207 | A | 6/1999 | Chaudhuri et al. |
| 5,918,229 | A | 6/1999 | Davis |
| 5,978,791 | A | 11/1999 | Farber et al. |
| 6,065,017 | A | 5/2000 | Barker |
| 6,065,018 | A | 5/2000 | Beier et al. |
| 6,374,266 | B1 | 4/2002 | Shnelvar |
| 6,408,310 | B1 | 6/2002 | Hart |
| 6,430,577 | B1 | 8/2002 | Hart |
| 2002/0055989 | A1* | 5/2002 | Stringer-Calvert et al. . 709/220 |
| 2002/0065919 | A1* | 5/2002 | Taylor et al. ................ 709/226 |
| 2002/0099914 | A1* | 7/2002 | Matsunami et al. ........ 711/154 |
| 2002/0188657 | A1* | 12/2002 | Traversat et al. ........... 709/201 |
| 2003/0079018 | A1* | 4/2003 | Lolayekar et al. .......... 709/226 |
| 2003/0145086 | A1* | 7/2003 | O'Reilly ..................... 709/226 |
| 2003/0236820 | A1* | 12/2003 | Tierney et al. .............. 709/203 |

OTHER PUBLICATIONS

"Integrating the Portable APPN Protocol Stack into a Multiprotocol Router", Alexander et al., IEEE Computing, pp. 133-141, 1995.*

U.S. Appl. No. 60/308,932, filed Jul. 31, 2001.*
U.S. Appl. No. 60/286,255, filed Apr. 24, 2001.*
U.S. Appl. No. 60/253,573, filed Nov. 28, 2000.*
U.S. Appl. No. 60/268,893, filed Feb. 14, 2001.*
U.S. Appl. No. 60/247,184, filed Nov. 9, 2002.*
U.S. Appl. No. 60/247,488, filed Nov. 8, 2000.*

Stephen Simon, "Peer-to-Peer Network Management In An IBM SNA Network", IEEE Network Magazine, pp. 30-34, 1991.*

Antony Rowstron et al, "Storage Management and Caching in PAST, A Large-Scale Persistent Peer-to-Peer Storage utility", ACM Digital Library, pp. 188-201, 2001.*

Jussi Kangasharju et al, "A Replicated Architecture for the Domain Name System", IEEE Transactions, INFOCOM 2000, pp. 660-669.*

Rhea, et al., article entitled Maintenance-Free Global Data Storage, IEEE Internet Computing, Sep.-Oct., 2001, pp. 40-49.

Doucer and Wattenhofer, paper entitled Large-Scale Simulation of Replica Placement Algorithms for a Serverless Distributed File System.

Druschel and Rowston, paper entitled "PAST: A large-scale, persistent peer-to-peer storage utility".

Douceur and Wattenhofer, Microsoft Research, paper entitled "Optimizing File Availability in a Secure Serverless Distributed File System".

Kubiatowicz, et al., Article Entitled OceanStore: An Architecture for Global-Scale Persistent Storage, Proceedings of the Ninth International Conference on Architectural Support for the Programming Languages and Operating Systems (ASPOLS 2000), Nov., 2000.

Bolosky et al., article entitled "Feasibility of a Serverless Distributed File System Depolyed on an Existing Set of Desktop PCs", SIGMETRICS 2000, 6/00 Santa Clara, CA.

Bolosky, et al., paper entitled "Single Instance Storage in Windows® 2000", Microsoft Research, Balder Technology Group, Inc.

Kubiatowicz, J., UC Berkeley slides entitled "OceanStore: Data Security in an Insecure World", 2001, pp. 1-16.

* cited by examiner

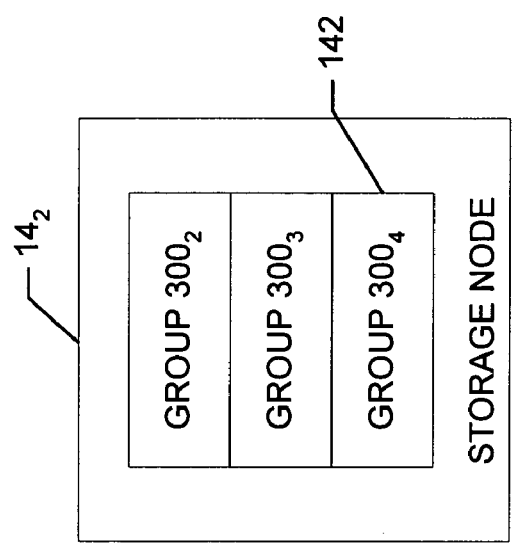
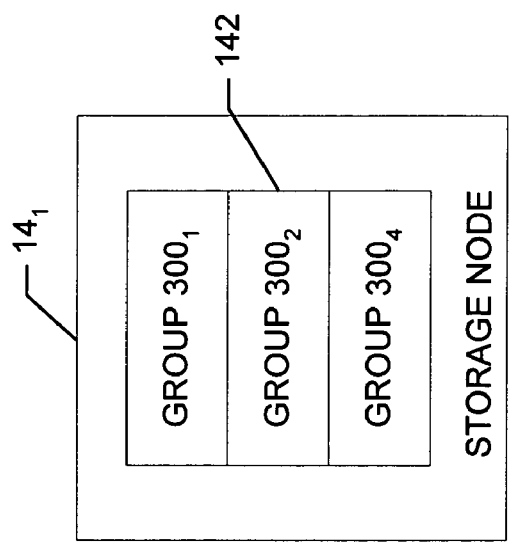
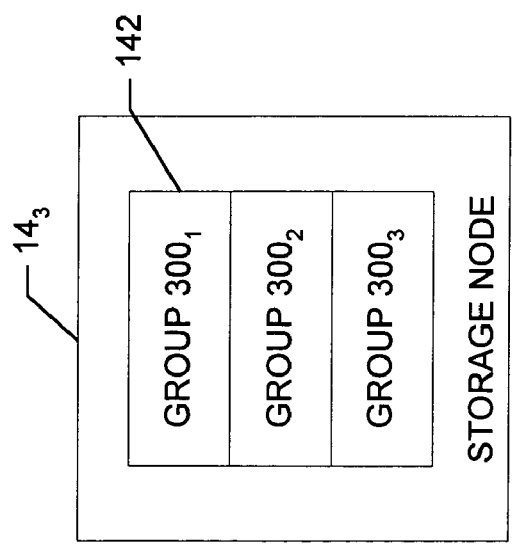
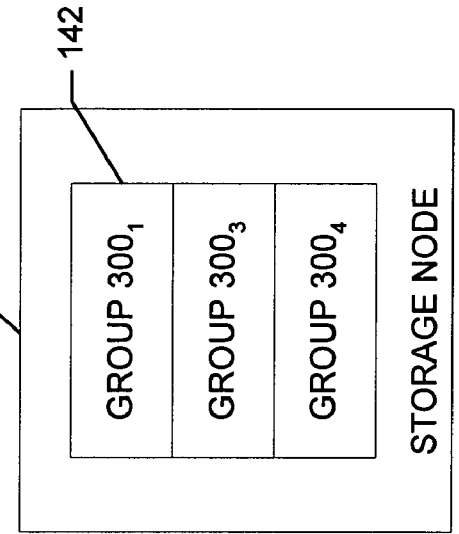
FIG. 5

PEER-TO-PEER ENTERPRISE STORAGE

CROSS-REFERENCE TO RELATED APPLICATIONS

The present application claims the benefit of U.S. Provisional Patent Application Ser. No. 60/268,765, which was filed on Feb. 14, 2001, by Sutherland, et al. for a PEER-TO-PEER ENTERPRISE STORAGE and is hereby incorporated by reference.

BACKGROUND OF THE INVENTION

1. Field of the Invention

The invention relates to data storage systems and, in particular, to distributed data storage systems.

2. Background Information

Computer networks for use in a business environment typically include a centralized file storage system. The network consists of various personal computers, laptops and so forth, that communicate over the network with the file storage system. The file storage system includes one or more servers that control the storage of information on and the retrieval of information from dedicated file storage resources, such as hard disk drives, magnetic or optical disks. As the demand for storage increases with growing demands for the retention of e-mail messages and attachments, Web-content, and multi-media applications, and electronic document storage, the storage capacity of the centralized storage systems is becoming larger and larger, and the systems are becoming more and more complex and costly to operate.

In order to control the storage and retrieval operations directed to the large capacity file storage resources, the file storage systems must be relatively sophisticated. Further, the operations of the storage systems must generally be overseen by specialized Information Technology ("IT") personnel, who are responsible for maintaining the integrity of the stored information and also for supporting the end users. The IT personnel spend much of their time regularly backing up the stored files and responding to end users' requests to recover lost files.

There are currently several types of centralized file storage systems that are used in business environments. One such system is a server-tethered storage system that communicates with the end users over a local area network, or LAN. The end users send requests for the storing and retrieving of files over the LAN to a file server, which responds by controlling the storage and/or retrieval operations to provide or store the requested files. While such a system works well for smaller networks, there is a potential bottleneck at the interface between the LAN and the file storage system. Further, the system essentially bundles applications, operating system platform and server hardware with the storage platform, which results in a storage system that lacks scalability and flexibility.

Another type of centralized storage system is a storage area network, which is a shared, dedicated high-speed network for connecting storage resources to the servers. While the storage area networks are generally more flexible and scalable in terms of providing end user connectivity to different server-storage environments, the systems are also more complex. The systems require hardware, such as gateways, routers, switches, and are thus costly in terms of hardware and associated software acquisition. Thereafter, the systems are costly to manage and maintain. Further, a bottleneck may occur at the interface between the networked end users and the storage area network.

Yet another type of storage system is a network attached storage system in which one or more special-purpose servers handle file storage over the LAN. The special-purpose servers may be optimized to operate as stand-alone devices, and may thus be distributed over the network to eliminate bottlenecks. However, distributing the servers eliminates centralized management of file backup and recovery operations, and the storage system can thus be expensive to maintain.

There are file storage systems currently under study that utilize distributed storage resources resident on various nodes, or computers, operating on the system, rather than a dedicated centralized storage system. The administration and management of the systems under study are also distributed, with the clients communicating peer-to-peer to determine which storage resources to allocate to particular files, directories and so forth. One such system is Ocean Store and the other is Farsite.

The Ocean Store and Farsite systems are organized as global file stores that are physically distributed over the computers on the system. A global file store is a monolithic file system that is indexed over the system as, for example, a hierarchical directory. This type of system has a potential bottleneck at the directory level.

The nodes in the systems use Byzantine agreements to manage file replications, which are used to promote file availability and/or reliability. The Byzantine agreements require rather lengthy exchanges of messages and thus are inefficient and even impractical for use in a system in which many modifications to files are anticipated. Thus the Ocean Store and Farsite systems may not work in a business environment.

What is needed is a file storage system that takes advantage of distributed storage resources available on the corporate computer network and operates in a manner that is compatible with the business environment, in terms of central administration and management, and system efficiency.

SUMMARY OF THE INVENTION

A peer-to-peer storage system includes a storage coordinator that centrally manages distributed storage resources in accordance with system policies administered through a central administrative console. The storage resources are otherwise unused portions of storage media, e.g., hard disks, that are included in the devices such as personal computers, workstations, laptops, file servers, and so forth, that are connected to a corporate computer network. The devices are hereinafter referred to collectively as "storage nodes." The system thus centrally administers and manages the system-wide reuse of storage resources that are otherwise available only individually to the respective devices.

As discussed in more detail below, the storage coordinator manages the distributed storage resources by assigning the nodes to various groups and allocating the storage resources on each of the nodes in a given group to maintaining dynamically replicated versions of associated files. A given file is thus continuously recoverable from any one of the nodes in the associated group even if a given storage node fails or, in the case of a laptop computer, a node is temporarily or permanently removed from the system. If a storage node is reconnected to the network after being off-line, the storage coordinator manages file synchronization and active replication operations, to update both the added node and the other nodes in the associated storage group. The group files can thereafter be readily recovered from any node in the storage group.

The storage coordinator may also be dynamically replicated on other storage coordinators in a cluster, to prevent disruption of the system if one of the coordinators should fail.

The dynamic replication and synchronization operations eliminate the need for daily system back-up operations. Further, the operations ensure that a user can recover a lost file from one of the storage nodes in the associated group. Accordingly, there is no need for file recovery operations to be overseen by IT personal.

As is also discussed in more detail below, the files stored in the system are assigned to public and private storage domains, or "storage lockers," based in part on whether the files are shared access files or single-user access files. The storage coordinator manages the respective storage lockers as one or more "replication groups," which are essentially a mechanism for allocating storage resources to user files. The storage coordinator creates a replication group when a user requests storage resources, and allocates to the replication group a predetermined amount of the storage resources on each of a selected number, or group, of nodes. The nodes in the selected group then participate in the dynamic replication of the files that are stored on the allocated resources in any of the selected nodes.

The storage nodes perform file replication and synchronization operations by communicating directly, that is, peer-to-peer. The nodes use an XML message-based protocol that allows the nodes to perform the dynamic replication and synchronization operations as background tasks that are transparent to the user. The protocol also allows the nodes to handle lost or corrupted messages, the interruption of the replication and synchronization operations, and so forth, as discussed in more detail below.

The storage coordinator balances the storage loads among various groups and minimizes the amount of network bandwidth devoted to file replication and synchronization operations by selectively assigning the nodes to the various groups. The storage coordinator may also migrate files and/or storage nodes from one group to another, in order maximize the extent to which particular files are locally available to the users who require them.

The storage coordinator also manages distributed searches of file content on the network. In response to a query from a user, the storage coordinator selects one node from each storage group to search through the associated replication group files. The selected nodes perform their searches and report the search results back to the storage coordinator, which organizes the results and provides them to the user. Thereafter, in response to a request for various files by the user, the storage coordinator instructs the storage nodes that are near neighbors of the user to provide the requested files. By careful selection of the nodes involved in a given distributed search operation, the storage coordinator minimizes the amount of network bandwidth consumed by the search operation.

Multiple storage coordinators may be used in systems that include multiple remote office locations connected to the network over a WAN and/or various relatively large departments that operate essentially as separate LANs, to provide more efficient management of the associated distributed storage resources. The multiple storage coordinators communicate separately with the administrative console and operate in accordance with the centrally administered, system-wide policies and/or with site-specific or department-specific policies established by the system administrator using the administration console. The multiple storage coordinator system is thus centrally administered and, in each office or department, centrally managed.

BRIEF DESCRIPTION OF THE DRAWINGS

The invention description below refers to the accompanying drawings, of which:

FIG. 5 is a functional block diagram that illustrates a storage node of FIG. 1 in more detail;

DETAILED DESCRIPTION OF AN ILLUSTRATIVE EMBODIMENT

I. The System

Figure 1:
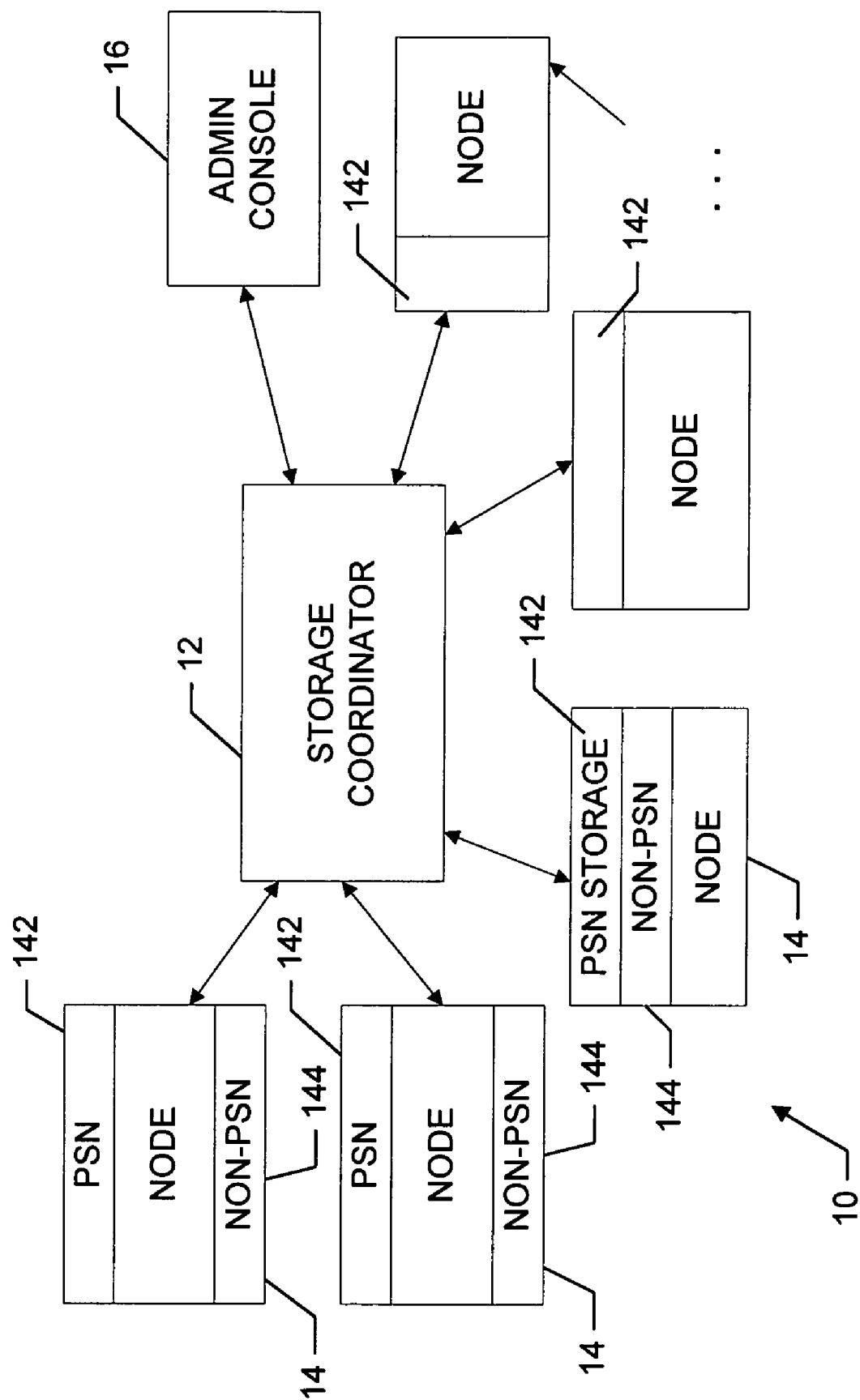
FIG. 1 is a functional block diagram of a distributed file storage system constructed in accordance with the invention.
Figure 2:
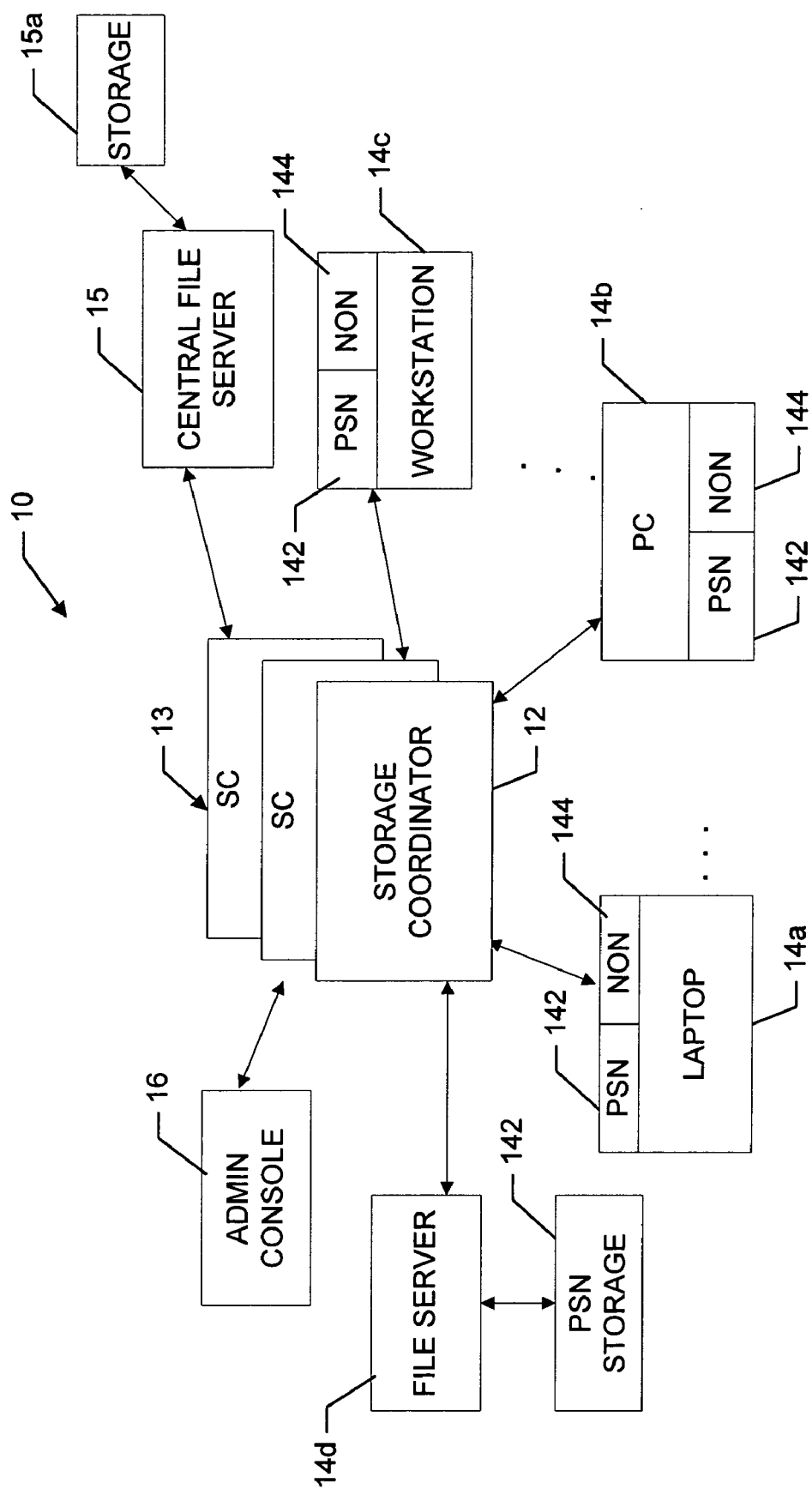
FIG. 2 is a more detailed block diagram of the system of FIG. 1.

Referring now to FIGS. 1 and 2, a peer storage network ("PSN") 10 includes a storage coordinator 12 that manages file storage and retrieval operations on distributed storage resources that consist of otherwise free portions 142 of storage media 140, i.e., hard disks, that are contained in networked storage nodes 14. The networked devices may be off-the-shelf laptops 14a, personal computers 14b, workstations 14c, and so forth, which are designed for stand-alone operation and thus include relatively large i.e., 10 or 20 gigabyte, hard drives. When a given device is connected to a network, however, most applications and files are shared, and thus, a relatively large portion of the hard drive remains free. The PSN re-uses the free portions of the hard disks for the storage of network files. One or more dedicated storage devices, such as a file server 14d, that operate under the control of the storage coordinator may also be included in the PSN.

The storage coordinator 12 assigns the nodes 14 to various storage groups, and directs the storage nodes in a given group to communicate directly, that is, peer-to-peer, to perform dynamic file replication operations that ensure that a given file is replicated at a predetermined minimum number of nodes. The PSN 10 may also include a cluster 13 of storage coordinators that communicate peer-to-peer in order to dynamically replicate file management information among the members of the cluster. Preferably, the cluster includes at least three storage coordinators, to ensure continued network operation in the event one or more of the storage coordinators fail. The replication operations eliminate the need for the daily system back-up that is performed in conventional networks. The replication operations are discussed in more detail below.

The storage coordinator 12 manages the storage resources in accordance with network policies that are set by a system administrator and administered through an administrative console 16. As discussed in more detail below, the policies dictate how the storage resources are to be utilized at the storage nodes, the number of replications, or copies, of a file that must be maintained by the system, whether the copies are to be stored locally or remotely, and so forth. The administrative console communicates the policies to the storage coordinator, which, in turn, communicates various policies to the storage nodes. The PSN 10 is thus administered and managed centrally, while file storage operations are performed in a distributed manner.

The storage media 140 in a given storage node 14 includes a PSN storage area 142 and a non-PSN storage area 144. The non-PSN storage area is designated for the storage of personal or device-specific files and applications. The PSN storage area is designated for network files, such as shared files and/or applications and email accounts. The term "files" used herein encompasses files, HTTP resources, e-mail messages and all other types of documents and objects. A user allocates a percentage of the storage media 140 to the PSN 10 based at least in part on the policies administered through the administrative console 16, as discussed in more detail below. To a user, the PSN storage area and the non-PSN storage area appear as separate drives.

As depicted in FIG. 2, an additional central server 15 may be added to the cluster 13 to operate as a central storage node that maintains a central backup of all the files on the PSN 10. The central server may be, for example, a storage area network that provides a dynamic, real time, backup of the entire system. The central server takes the place of a conventional backup tape system.

Figure 3:
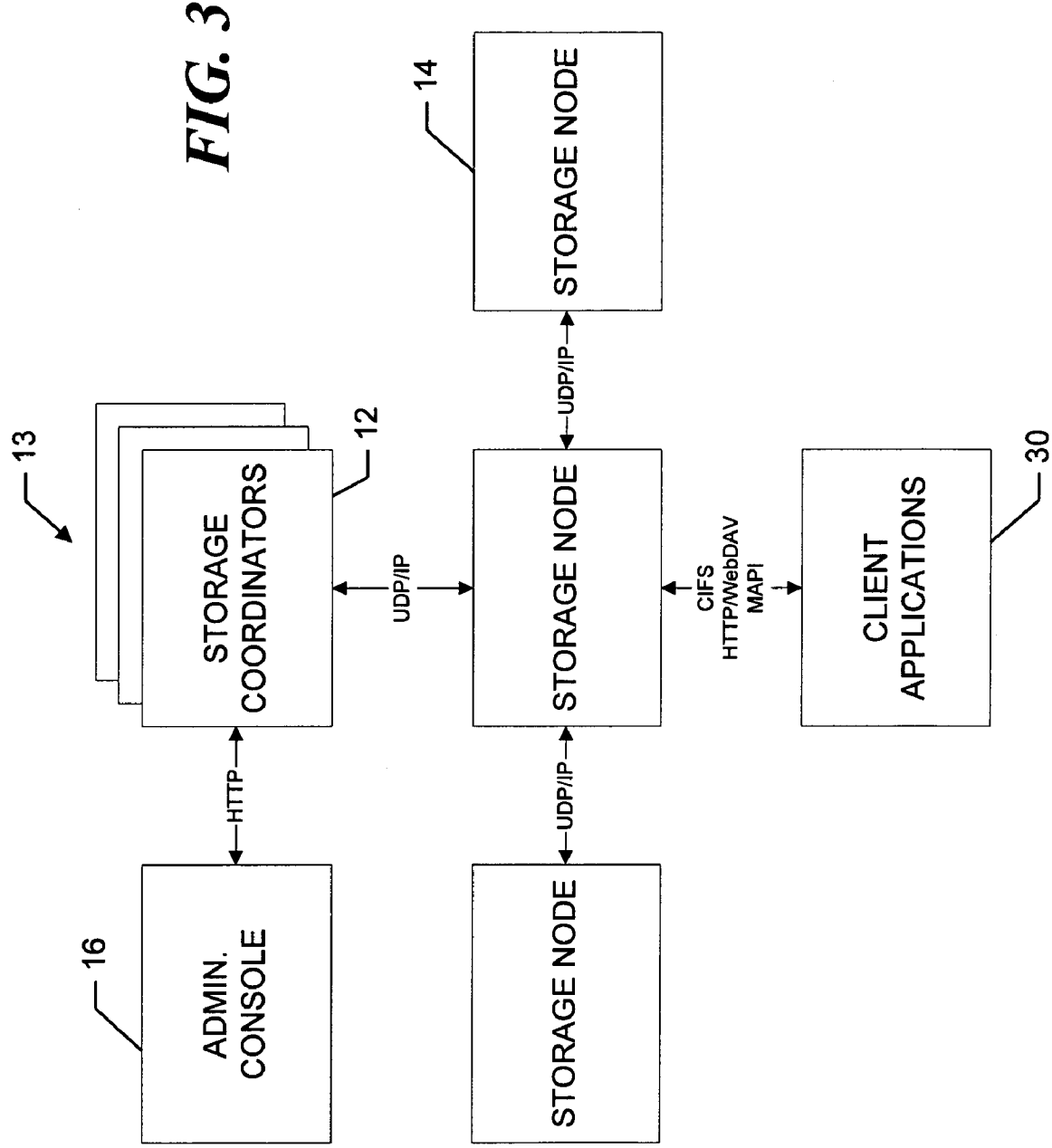
FIG. 3 is a functional block diagram that represents an operational model of the system of FIG. 1.

FIG. 3 depicts an operational model of the PSN 10. Each storage node 14 implements standard interfaces, e.g. CIFS, HTTP/WebDav and MAP I, to provide client applications 30 access to the files stored on the PSN, regardless of where the files are physically stored. Client applications are essentially any software that uses the PSN to store and retrieve files.

Figure 4:
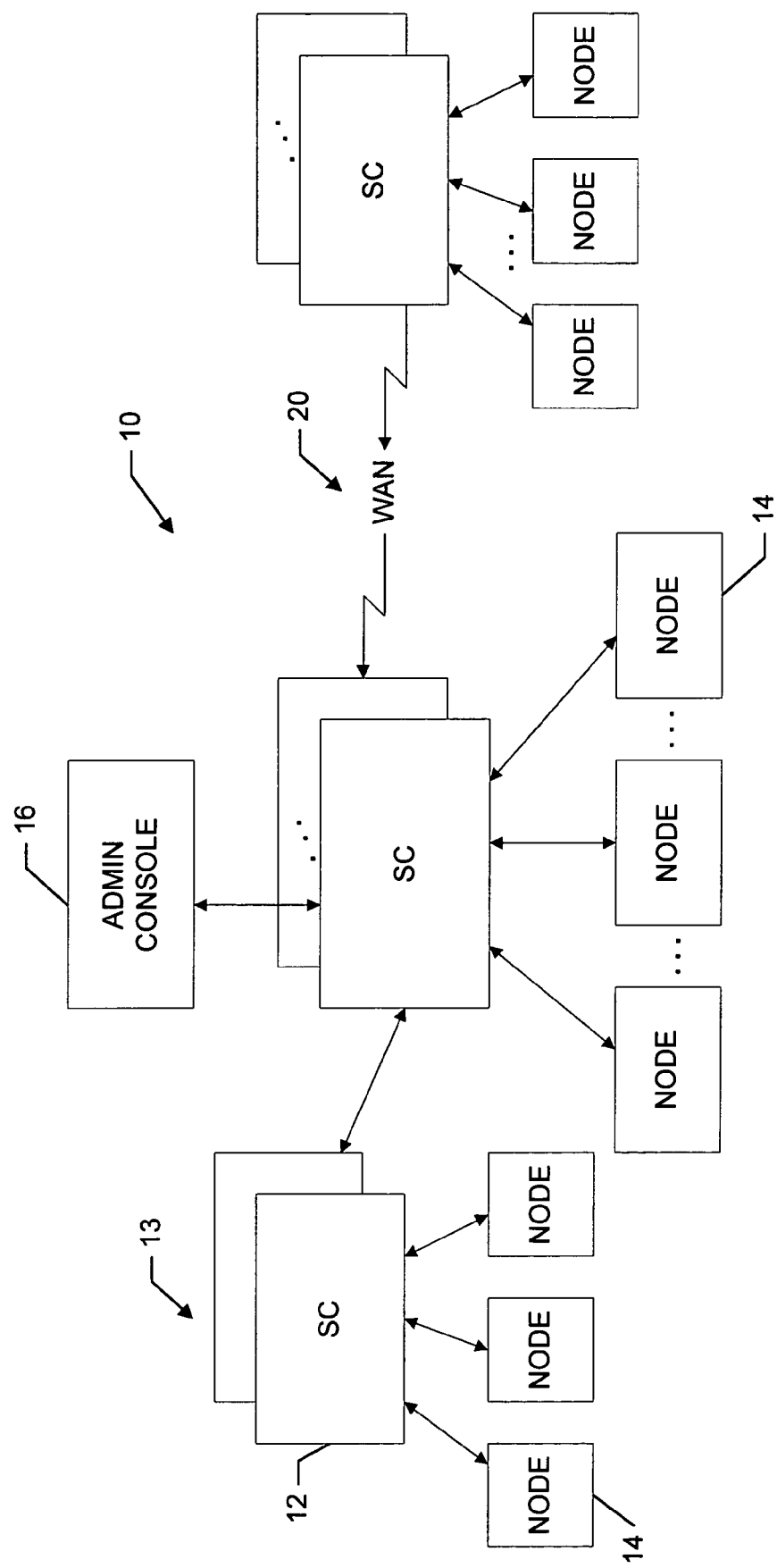
FIG. 4 is a functional block diagram of an extended system of FIG. 1.

Referring now also to FIG. 4, a PSN 10 that encompasses various business sites that are networked over a WAN 20 may include separate storage coordinators 12 and/or clusters 13 for the various sites, to promote efficient management of the storage resources at the sites. Similarly, various company departments that operate essentially as separate LANs 22 may include separate storage coordinators 12 or clusters 13. As discussed in more detail below, the system administrator may set different policies for the various sites and departments, with the administrative console 16 providing the appropriate policies to the various storage coordinators, which then manage file storage operations for the departments, sites, and so forth in accordance with the policies. The network is thus readily scalable by adding more storage coordinators 12 and associated nodes 14 and, as applicable, setting appropriate policies.

A storage coordinator 12 manages file storage by creating storage domains, which are referred to herein as "storage lockers." There are two types of storage lockers, namely, private storage lockers and public storage lockers. A private storage locker contains information that is to be accessed by a single user, such as an e-mail account or a backup of the user's non-PSN storage area 142. A public storage locker contains information that is to be shared among all or portions of the users of the network. Different public storage lockers may be used, for example, for files that are associated with different qualities of service, and/or files that have different access criteria, and so forth.

While the files contained in a storage locker may be organized in folders and directories, the storage lockers are not file organizational tools. Rather, as discussed in more detail below, the storage lockers are mechanisms for allocating storage resources to the files and also for controlling access to the files.

Referring now to FIG. 5, the storage coordinator 12 manages the storage lockers by creating replication groups 300 to store the files that are part of the storage locker. A replication group is essentially an allocation of network storage resources 142, both in terms of the amount of storage that is associated with the group and the set of storage nodes that allocate their resources to the replication group.

The storage coordinator creates a replication group in response to a request from a user for allocation of additional storage locker resources. The storage coordinator thus selects the nodes for the replication group, and contacts the selected nodes to instruct them to reserve an appropriate amount of their PSN storage resources for the replication group files. Thereafter, the selected nodes communicate with one another, peer-to-peer, to dynamically replicate the files that are to be stored in the resources allocated to the group.

A small storage locker may be associated with a single replication group, while a large storage locker may be associated with a number of replication groups. The storage coordinator 12 assigns additional replication groups to a given storage locker as the storage locker resources are utilized by the nodes. As discussed in more detail below, the files contained in a given storage locker can be compressed, to conserve storage capacity and reduce the amount of data that must be replicated. As appropriate to control access, the files may be encrypted and the storage coordinator may require that a user have a valid encryption key before gaining access to the locker and/or the contents of the files. The creation and use of the lockers and replication groups as discussed in more detail below.

As depicted in the drawing, each storage node $14_1$, $14_2$, ... is associated with a number of the replication groups $300_1$, $300_2$ ..., and each replication group includes at least a minimum number of storage nodes. The nodes $14_1$, $14_3$ and $14_4$ form a replication group $300_1$, the nodes $14_1$, $14_2$ and $14_3$ form a replication group $300_2$, and so forth. Generally, the storage coordinator 12 assigns the respective storage nodes 14 to different sets of replication groups, essentially to distribute the replicas of the files over the system, and thus, provide resiliency to the system.

The storage coordinator 12 assigns the storage nodes 14 to replication groups in accordance with the various policies administered by the administrative console 16. One such policy is the minimum number of file replicas that must be maintained by the system in all or certain types of storage lockers, and the storage coordinator thus assigns to each group at least the number of nodes required to meet the applicable replication policy. The administrative console may also set policies that dictate the make-up of the replication groups, such as requiring that at least one of the storage nodes in a given group be located remotely relative to the other nodes in the group, and/or that the storage nodes in a group communicate with the other members of the group by high speed connection. Other considerations in assigning the storage nodes 14 to the groups may be related to network configuration. For example, the storage coordinator may take into account network traffic patterns, connection speeds, and so forth, in order to establish groups in which the members can communicate peer-to-peer to perform dynamic replication and synchronization operations, without having an adverse impact on network bandwidth.

The storage coordinator 12 may also take into consideration the types and/or uses of the nodes when it organizes the replication groups. For example, the storage coordinator may assign more than the minimum number of storage nodes to a replication group that includes a device which is repeatedly attached to and removed from the PSN 10. The storage coordinator may also assign the device to a relatively small number of groups and/or to groups in which the volume of activity is relatively light, to minimize the extent of the synchronization operations and active replication operations that must be performed to bring the device up-to-date each time the device is re-connected to the network.

The storage coordinator 12 manages distributed searches of the network files through the groups. In response to a user query, the storage coordinator selects one storage node 14 per group to perform a search of the content of the files associated with the respective replication groups. After conducting their searches, the selected storage nodes send the results of the search back to the storage coordinator. The storage coordinator then organizes the results and presents them to the user. In response to requests for one or more of the files from the user, the storage coordinator instructs appropriate storage nodes from each of the various groups to send copies of the requested files to the user.

To minimize the network bandwidth consumed by the search, the storage coordinator selects as the searcher in a given replication group a node that is a relatively near neighbor of the storage coordinator. Also, the storage coordinator selects near neighbors of the user to provide the requested files to the user. The storage coordinator may further balance network bandwidth and speed considerations by making the node selections for the search operation based in part on workloads at the various nodes in a group and/or the congestion of connections between the various nodes and the storage coordinator or the user.

The storage coordinator 12 further manages the distributed storage resources 142 by determining when a given file and/or storage node should be migrated to a different replication group, in order to maintain files essentially local to a user. Also, in accordance with administrative policy, the files that are used relatively frequently by a given storage node may be automatically cached at the storage node. As discussed below, a master replication group is maintained for every locker in a master replication group that includes the storage coordinator. The file allocation table for a given locker may be cached at one or more of the storage nodes.

Figure 6:
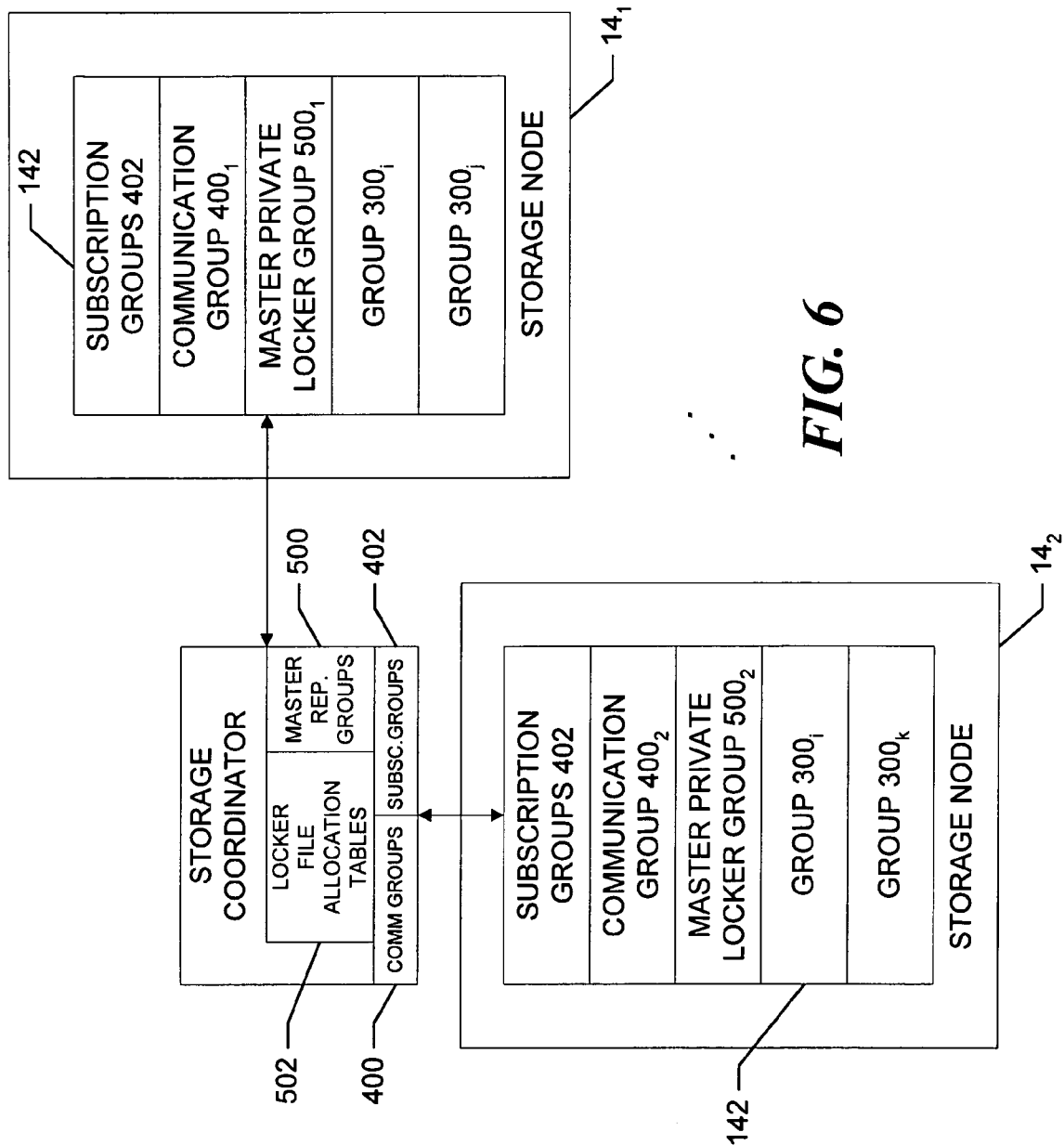
FIG. 6 is a functional block diagram that illustrates a storage coordinator and storage nodes of FIG. 1 in more detail.

Referring now to FIG. 6, the storage coordinators 12 do not provide resources for network file storage and are thus do not participate in storage groups. A given storage coordinator is, however, a node in a master replication group 500 of every storage locker created by the storage coordinator. The replication groups maintain file allocation tables 502 for the respective lockers. The master replication group includes all of the storage coordinators in a cluster and, as necessary to meet minimum replication policies, one or more storage nodes. The master replication group for a private storage locker also includes the "home" node. The storage coordinators are also nodes in communication groups 400, which are established to allow the storage coordinator to communicate with the respective individual storage nodes 14 for purposes of registering the nodes, requesting storage resource allocations, and so forth. Thus, the storage coordinator and the respective nodes must allocate storage resources to the communication groups. The communications among nodes in a given communication group are made using the same message-based protocol discussed above with reference to replication groups. The storage coordinators are also members of a global subscription group 402 that also uses the same message-based protocol to provide system policies globally to the storage nodes 14. As appropriate, the storage coordinators may be members of regional subscription groups through which the storage coordinators provide regional policies to the storage nodes in the respective regions. The various subscription groups provide the policies to the nodes as read-only messages.

As discussed in more detail below, the storage coordinators 12 are responsible for cataloguing the storage nodes 14 that are available within the PSN 10 and the resources available on each of the respective nodes. The storage coordinators are also responsible for enforcing network policies, and for notifying the system administrator of critical network conditions and/or problems with the respective storage nodes.

Before discussing in more detail the operations of the storage coordinators and the nodes with respect to adding nodes to the network, creating the lockers, and establishing the replication groups and the associated storage groups, we discuss the administrative policies that are put in place by the system administrator, using the administrative console 16 (FIG. 1).

II. System Administration Policies

Node Allocation and Availability

The system administrator sets a disk allocation policy that specifies the maximum and minimum thresholds for the amount of storage capacity at a given node 14 that can be dedicated to the PSN 10. The system administrator also sets a node availability policy that determines when a node is unacceptable as a storage node because of its pattern of usage. The node availability policies are manifest in parameters for network connections, including type, speed, and percentage of time used. Further, a threshold is set for maximum time a node may regularly go off-line. If a given node cannot meet the minimum space allocation and availability thresholds, the node is not included in the PSN as a storage node, and is instead allowed to connect to the network to gain access to the files stored therein.

Node Addition Removal and Recovery

The system administrator sets policies for adding a storage node to the PSN by specifying the following:

Verify New Node Yes/No

Catalog Node Contents Yes/No

Create Private Lockers For All Users Yes/No

The system administrator may also set node removal and recovery policies that dictate when storage groups must be reorganized. The removal policy parameters include whether or not verification of the removal is required before the groups are reorganized. The recovery policies typically include thresholds for the timing of various stages of alerts to the administrator. In addition, the recovery policies may dictate when or whether a node is allowed to participate in recovery operations, which include re-synchronization of the node with the nodes in the various storage groups of which the node is a member.

Storage Locker Allocation and Storage

The system administrator specifies the percentage of the PSN storage resources that can be allocated to the public versus private storage lockers by setting the following parameters separately for private lockers and for public lockers:

Replication Group Allocation Size

Maximum size of Private/Public Locker

Minimum size of Private/Public Locker

Allow users disable File Version History Yes/No

Store File Version History—Yes/No

Default number of file versions stored

Minimum number of file versions stored

Maximum number of file versions stored

The storing of file versions in the various storage lockers is discussed in more detail below.

The system administrator further sets policies that determine how much of the space allocated to the private lockers and to the public lockers can be allocated to individual private or public lockers. The system administrator thus sets the following parameters separately for individual private and public lockers:

No. of Replicas
Location of all Replicas
Type of Communication Link,
Remote node yes/no
Location in WAN The system administrator further sets data security policies for the private lockers and, as appropriate, the public lockers. The policies assume various levels of protection are available in the system, and include the following parameters:

Encrypt Data Yes/No
Encryption Cipher to Use
Encryption Strength
Compress Yes/No The data security policies may further include policies relating to secured access to the lockers. File encryption and secured locker access are discussed in more detail below in terms of PSN security.

File Replication Policies

The system administrator sets policies that govern the replication of files between the nodes in a storage group. The administrator sets global replication parameters, such as the level of file compression, that are used across the PSN. In addition, the administrator may establish parameters for particular replication operations such as those performed among nodes on the same LAN, or nodes on a WAN. The system administrator may thus establish the timing and rate of the operations by, for example, restricting the operations to off-peak hours, setting the length of intervals between operations, and so forth. As appropriate, different parameter values may be set for various network segments, i.e., sites, departments, and so forth.

III. Installing the PSN

When the PSN is being installed, the storage coordinators are set up and they then attempt to define the characteristics of the underlying corporate network. The storage coordinators thus set out in a conventional manner to ascertain the characteristics of the various network connections, or links, and the location of the network nodes.

The storage coordinators may use conventional software resources, such as SNMP, to discover network resources such as routers that can be used to define the structure of the underlying corporate network and for each connection, the speed, i.e., total bandwidth, the latency of the connection, the availability of the connection, i.e., is the connection permanent or dial-up, and whether or not burst data can be sent over the connection. Alternatively, the storage coordinators may acquire the information from a Windows Active Directory, if available. If no automated resources are available, the system administrator identifies and characterizes the network connections for the storage coordinators.

The system administrator may also establish parameters for use of the connections for PSN operations. For a given connection or type of connection, the system administrator may set hours during which a connection may be used for file replication. Further, the system administrator may define the use of the connection as a percentage of the total capacity of the link. The system administrator also specifies how IP address ranges are spread over the underlying network, so that the storage coordinator will be able to determine the current locations of the network nodes. Further, the system administrator provides the information necessary for the storage coordinator to authenticate the nodes, that is, to establish trusted communications, as part of a node registration process.

Using the link and node location information, the storage coordinator can assign nodes to storage groups and can appropriately manage replication operations. By knowing the ranges of IP addresses over the entire corporate network, the storage coordinator can determine when a node has moved to, for example, a new office, and thus determine if different policies apply to the replication operations that include the re-located node. For example, the storage coordinator may be required to manage the replication operations in accordance with the policies that apply to groups that include remotely located nodes.

Once the underlying corporate network has been characterized, the storage coordinator communicates with the various nodes, to register them as participants in the PSN. As discussed, certain corporate network nodes may not meet storage node allocation and/or storage node availability criteria for the PSN. Thus, not every node on the corporate network may be a storage node on the PSN. Rather, certain nodes such as laptops that travel with a user may only connect to the PSN to access files stored thereon.

Figure 7:
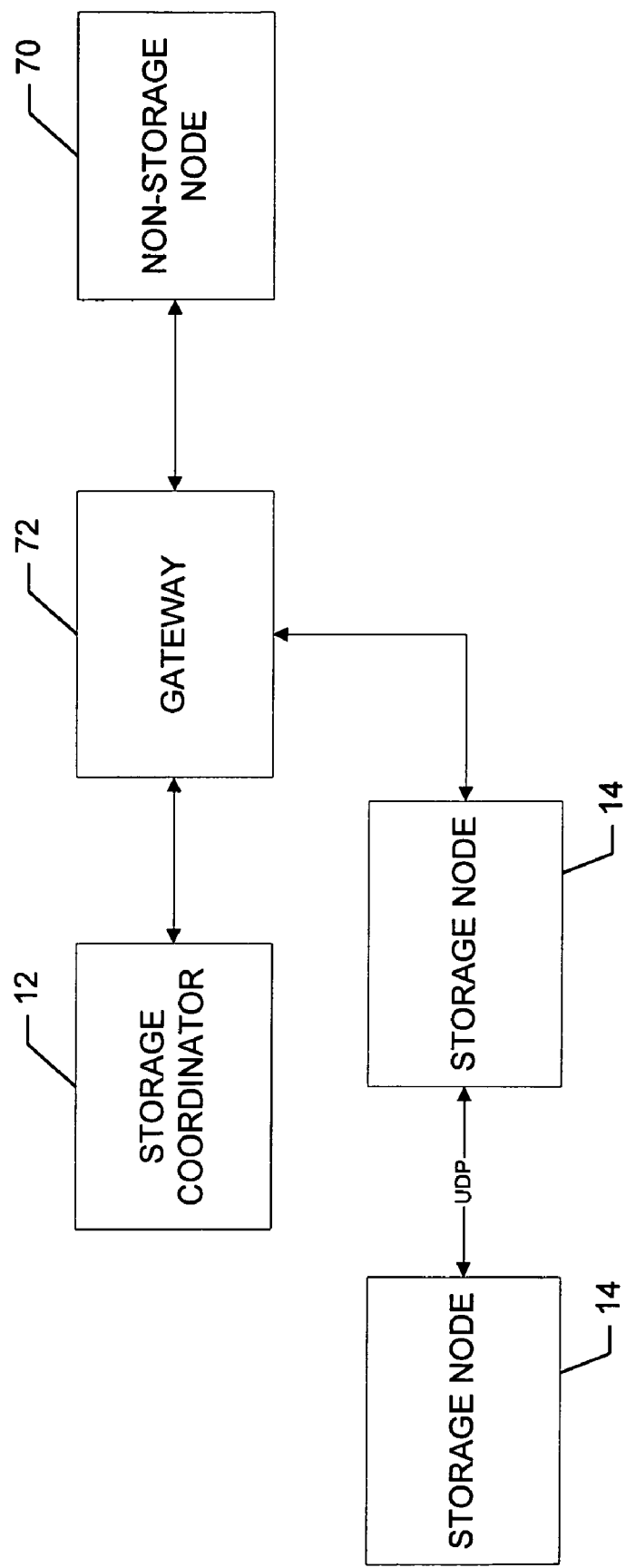
FIG. 7 is a functional block diagram that represents an operational model of the system of FIG. 1.

Referring now to FIG. 7, the non-storage nodes 70 communicate with the PSN 10 through a gateway 72, for example, a CIFS gateway, using an appropriate interface, in the example, the CIFS interface. When a non-storage nodes requests a file, the CIFS gateway communicates with the storage coordinator 12 to determine the location of the requested file. The gateway then obtains the file from the appropriate storage node and provides the file to the non-storage node. As necessary, the gateway decrypts the file before providing the file to the non-storage node. Similarly, the gateway communicates with the storage coordinator to determine where to send files created or modified by the non-storage node. The gateway then performs any necessary encryption of the file and provides the file the appropriate storage node. When a connection to the PSN over a gateway is in place, the storage coordinators must take the bandwidth requirements of the connection into account when managing replication operations and/or search operations, to avoid network congestion.

IV. Registering a Node

Figure 8:
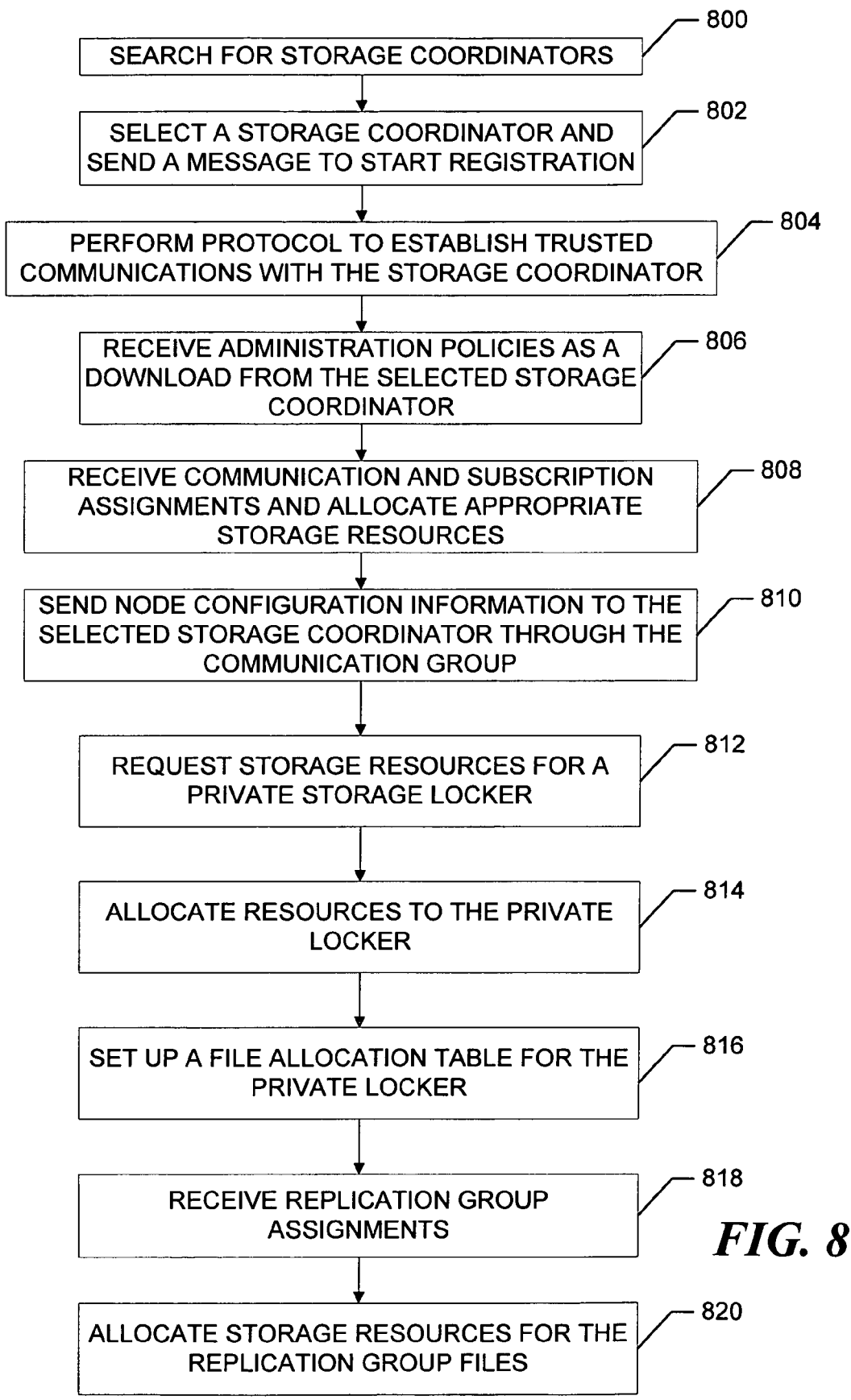
FIG. 8 is a flow chart of the operations of a node in a node registration operation.

Referring now to FIG. 8, when a node is to be added to the PSN, the node searches for a storage coordinator (step 800). The node thus broadcasts a message on the network using, for example, the UDP protocol, to elicit function and/or location information about the storage coordinators. Alternatively, the node performs a DNS lookup for a standard storage coordinator name, i.e., sc.<DomainName>.<DomainType>, or the node may perform a search using a host name or an IP address provided by the system administrator. In a Windows domain, the node may instead search the Active Directory for storage coordinator resources. The storage node then selects an appropriate storage coordinator based on the function and/or location information provided (step 802).

The node next exchanges information with the storage coordinator as part of an authentication protocol that establishes trusted communications (step 804). The protocol is similar to the protocol used to establish an SSL session.

Once trusted communications are established, the node receives from the selected storage coordinator 12 a download of the system-wide and, as appropriate, regional, policies established by the system administrator through the administrative console 16 (step 806). The node is also included in a communication group created by the storage coordinator for communications between the node and the storage coordinator (step 808). Through the communication group, the node sends to the storage coordinators information that identifies the user of the node and also specifies the type of storage node, e.g., personal computer, workstation. Further, the node sends through the communication group node configuration information relating to hardware specifications, installed software and network connections available to the node (Step 810). The communications through the communication group are performed using the same XML message-based protocol that is used for all replication operations, to ensure that the storage node and the selected storage coordinator receive every message, even if the node or the coordinator should go briefly offline and/or the registration process is interrupted.

As part of the registration process, the user specifies what percentage of the node's storage resources can be allocated to the PSN 10. The user further specifies the expected patterns of usage for the node, i.e., how often the node is expected to be available over the network, and so forth. The system may provide the user with a number of usage profiles, and the user then selects one that best represents the node. Alternatively, the system may present the user with a number of questions designed to elicit the desired information.

If the storage coordinator 12 determines, based on the system policies, that the node should be added to the PSN as a storage node, the node is included in a master replication group for the user's private storage locker. The node then allocates storage resources for the group and sets up a file allocation table that is maintained by the master group (steps 814, 816). As appropriate, the node is also included in a new replication group and/or in an established replication group, and the node allocates the resources to the groups (step 818, 820).

Figure 9:
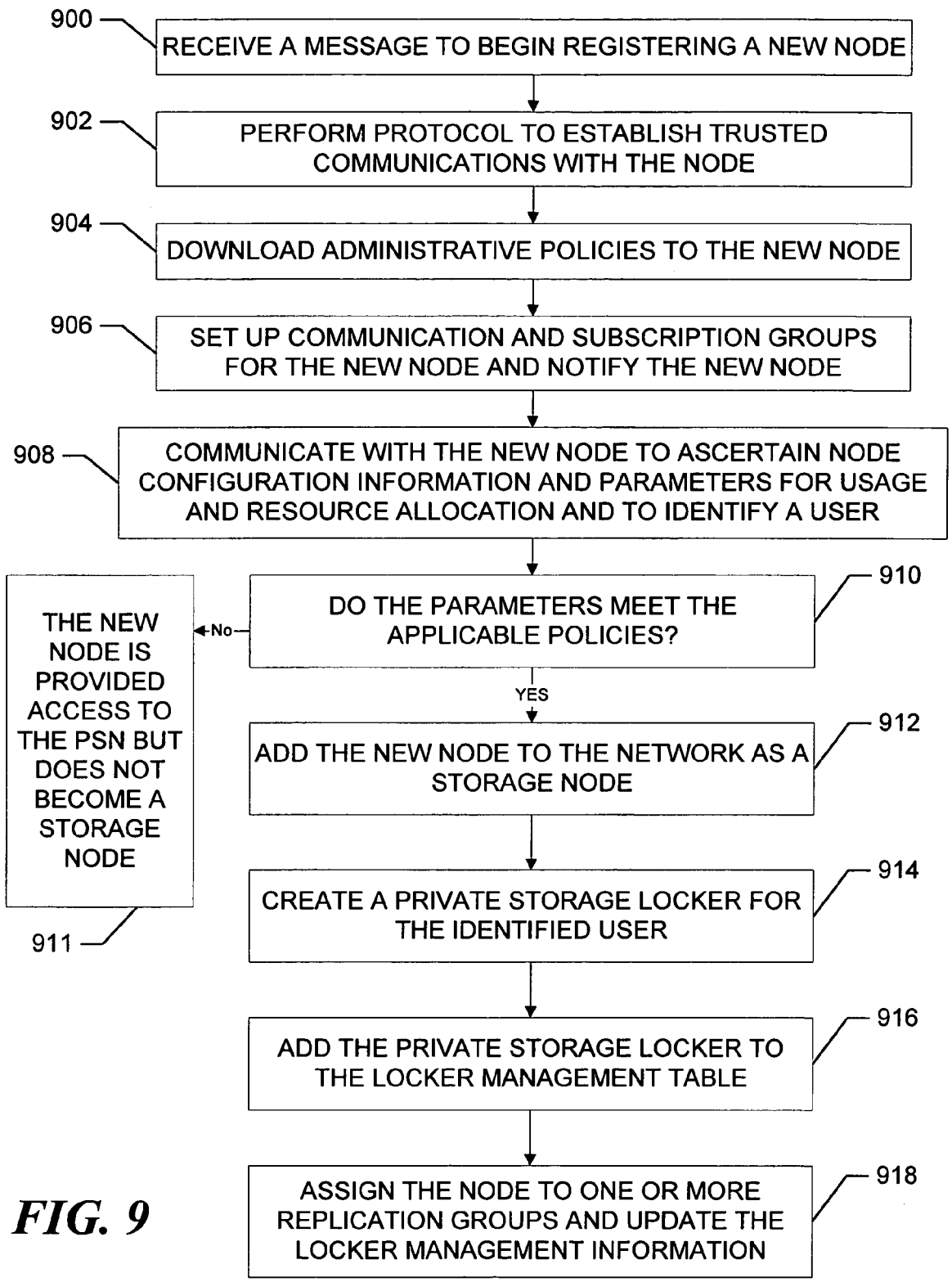
FIG. 9 is a flow chart of the operations of the storage coordinator in a node registration operation.

FIG. 9 describes the operations of the storage coordinator during a node registration process. Specifically, the storage coordinator authenticates the node, downloads policies, sets up various communication groups and communicates with the node to establish node configuration and allocation parameters (steps 900–908). The storage coordinator then determines if the node meets the minimum requirements for a storage node (step 910). If not, the node is registered as a non-storage node (step 911). If so, the new node is registered as a storage node and a private locker is created (steps 912–914). The storage coordinator then updates the various locker management tables, establishes a file allocation table for the new locker with the node as the home node and includes the node in the master replication group for the locker (step 916). The storage coordinator thus enters the private locker and replication group assignments in a locker management table. The table contains a list of the replication groups and associated storage groups that make up each of the lockers, and the space available in each locker for new replication groups. The table may also include the file allocation table for the locker. Alternatively, the file allocation table may be included as a separate table. The locker management table and, as appropriate, related file allocation tables are replicated in each of the storage coordinators in a cluster 13, to protect the information and allow the storage coordinators to balance the management load. As appropriate, the storage coordinator assigns the node to various replication groups and updates the associated tables accordingly (steps 918)

V. Creating Lockers and Replication Groups

Based on the system policies, the storage coordinators create private storage lockers and associated replication groups when a new storage node is added to the PSN. Thereafter, the storage coordinator creates lockers and replication groups in response to requests from the storage nodes. Specifically, the storage coordinator creates a private storage locker in response to a message that a new user has access to the network over a given node, assuming that the creation of an additional private locker at the node does not violate an administrative policy. The storage coordinator creates a new public locker in response to a request for one from a user who is authorized and/or allowed under the applicable administrative policies to make such a request.

To create a new locker the storage coordinator establishes a master replication group that contains a directory or file allocation table for the locker. When a user thereafter requests storage space from the locker, the storage coordinator creates additional replication groups, as discussed below, and provides updated information to the master replication group. As discussed, the locker and replication group information is also added to the locker management table.

The users specifies in a request for a new locker both the type of locker requested and the attributes for the new locker. The user thus specifies:

Name of Locker
Initial size of Locker
Version history (Yes/No)
Number of versions to maintain
Index Locker (Yes/No)
Level of recoverability (number of replicas to maintain)

The storage coordinator compares parameters included in the request and, in particular, the requested size of the locker, against the system policies. As appropriate, the storage coordinator establishes the requested storage locker, assigns the requesting node to the master replication group, lists the requesting node as the home node for the locker in a file allocation table, and updates the locker management table.

The storage node maps the new locker to the CIFS server component of the storage node's software. This ensures that the user can copy or save files into a drive associated with the new storage locker as if the entire locker were on the user's local hard drive. The actual location or locations of the files contained in a storage locker is thus transparent to the user.

The nodes in a storage group keep track of the use of the resources allocated to the associated replication group. When a predetermined threshold is exceed, one or more of the nodes in the group request additional storage space from the storage coordinator. The storage coordinator then allocates additional storage space in the storage locker by creating a new replication group and associated storage group. The storage coordinator notifies the master replication group about the new group, and the master group updates the file allocation table. Further, the storage coordinator updates its locker management information to include the new group.

As discussed above, the storage coordinator selects the nodes for a storage group based in part on the system policies that dictate the number of replicas and whether a remote node must be included in the group. Further, the storage coordinator attempts to balance work load among the storage nodes and/or among the connections between the nodes, such that replication operations will have a minimum adverse effect on network bandwidth.

VI. File Storage

A user saves a file to a locker, or more particularly, in a replication group contained in the locker, by designating that the file be saved on the drive assigned to the locker. The CIFS interface at the user's node handles the storing of the file on the PSN resources 142 allocated to the replication group. If the user's node is not a member of the replication group, the CIFS software provides the file to a storage node in the appropriate storage group. As discussed below, the node contacts the storage coordinator to determine where to send the files for storage.

Before a file is stored on a storage node 14 in the designated storage group, the node follows the applicable storage locker policy that is set by the administrator and administered through the administrative console 16. Typically, the file is first indexed, so that the index can be used for content-based searching. Next, the file is compressed, to save disk space and also to reduce the amount of data that must be replicated. The compressed file is then encrypted, using the cipher and key size defined in the applicable locker security policy. The file is then ready for replication to the other nodes in the storage group, as discussed in more detail below.

When a file is saved a second time, a new version of the file is stored in the file folder. The older version of the file remains available in accordance with the storage locker versioning and file history policies. The policies may, for example, allow a particular number of versions to be maintained for some defined period of time. As needed, a user may access the prior versions of the file to, for example, recover lost data.

All files are listed in the appropriate storage locker file allocation tables maintained in the respective master replication groups. The table entry for a given file contains links to the actual file stored in the PSN. The links are based on universal resource identifiers (URIs) as defined by the W3C.org. A major difference between conventional URIs and the table entries is how the file system hierarchy is represented. The table entry includes a file Id that specifies a replication group, a node and a message number that indicates where the file was inserted into the PSN. The URI for the PSN file is thus:

File://<Locker Name>/<Replication Group Id>/<File Id>, where File Id is made up of a Replication Group Id, a Node Id and a Unique Message Number.

VII. Replication Operations

As discussed, the replication operations are performed as background tasks that are transparent to a user. The operations are relegated to times, rates and connection bandwidths that are dictated by the system administrator.

Replication is performed using a connectionless message-based protocol that is based on a Web Riposte™ protocol developed by The Escher Group. The protocol uses the User Datagram Protocol/Internet Protocol (UDP/IP) and thus makes efficient use of available network bandwidth.

When a file is saved, the file is stored as a series of numbered messages, that each contain a unique message identifier. During the replication operation a file to be replicated is provided to a receiving node as a series of the numbered messages. The node receiving the messages stores the messages in the allocated storage resources. The storage nodes in a storage group later exchange information relating to the group-related messages they have stored. If a given storage node determines that it is missing a particular message, the storage node requests the missing message from one of the other nodes in the storage group. This process continues until the group files are synchronized at every storage node in the storage group.

VIII. Security

The files stored in the private storage lockers and/or in the public storage lockers may be encrypted in accordance with the policies administered through the administrative console. The system may also require authentication of a storage node before the node is granted access to the files contain in the storage lockers. We discuss below the various security mechanisms that may be employed for a storage locker.

Node Authentication

As part of the storage node registration process, a storage node 14 receives a private identifier, which is used to authenticate the node with the storage coordinator. The private identifier is a private key from a public key cryptosystem and the associated public key is installed on the storage coordinator. The storage coordinator uses conventional cryptographic authentication techniques to authenticate the storage node.

Private Lockers With Encryption

When the storage coordinator creates a private locker that utilizes encryption, the storage coordinator generates a pair of public and private keys $K_{PUB}$ and $K_{PRIV}$. The storage coordinator then encrypts $K_{PRIV}$ using the associated user's password and provides the encrypted $K_{PRIV}$ and $K_{PUB}$ to the storage node that is managing the private locker.

When a file is to be stored in the private locker, the storage node that manages the locker generates a private key $K_{DES}$ which is based on a private key algorithm and encrypts the file using $K_{DES}$. The storage node also encrypts $K_{DES}$ using $K_{PUB}$ and concatenates the encrypted key and the result of encrypting the file, to produce an encrypted file that is then stored on the managing node and replicated to the other nodes in the associated storage group.

The encrypted file can be decrypted only by those users who are in possession of $K_{PRIV}$. Thus the user who has control of the private storage locker can determine who has access to the files stored in the private locker, regardless of where the files are stored.

For added security the encrypted file can be encoded using Reed Solomon encoding. The encrypted file is thus encoded in accordance with a selected Reed Solomon code, to produce a Reed Solomon code word. The code word is then broken up into n sections, such that the code word can be reconstructed from any subset of m of the sections, where n and m are preselected values. The managing node supplies the sections to the various replication groups associated with the private locker, such that the sections will be stored on the associated group nodes. No one node will then contain the entire code word, and the file can not be reconstructed without data from other nodes that contain sections of the codeword.

Public Lockers With Encryption

A similar encryption method is used for the public lockers. However, since multiple users must have access to the files contained in the public locker, the private/public key pair associated with the locker must be accessible to all users who have write permission to access the locker. Those with read permission will need to be in possession of only the private key. Also, as the list of those permitted to access the locker changes, new keys are issued to allow new users access to the locker and to prevent non-permitted users from gaining access to the locker. The storage coordinator maintains information that associates each file in a locker with an appropriate public/private key pair.

When the storage coordinator creates the public locker the storage coordinator associates a first public/private key pair $K_{PUB1}$ and $K_{PRIV1}$ with the locker. The storage coordinator maintains a directory that associates $K_{PRIV1}$ with the files that are encoded using $K_{PUB1}$. On request the storage coordinator provides $K_{PRIV1}$ to permitted users who require access to the files in the directory.

When there is a change to the permitted users, the storage coordinator generates a new key pair, namely, $K_{PUB2}$ and $K_{PRIV2}$. The storage coordinator similarly maintain a directory that associates the new private key with the files that are encrypted using the new public key, and on request provides both the new and the old private keys to permitted users who require access to the files. The next time there is a change in the permitted users, the storage coordinator generates a new key pair, and so forth.

The storage coordinator maintains the directory structure information for each locker in the locker management tables. The information in the tables further includes the respective storage nodes and groups in which the files, or as applicable sections of the files, are stored. Any authorized node can obtain this information in order to gain access to files stored in the locker.

When a storage node requires a file that is stored in the locker, the storage node first authenticates itself with the storage coordinator using the private identifier that is stored in encrypted form in the node. The storage coordinator thereafter determines if the node is authorized to have access to the requested file. If so, the storage coordinator provides the node with the applicable $K_{PRIVi}$, and a list of the storage nodes that have a copy of the file. The storage coordinator also acts as a third-party trusted server for authentication of the requesting node to the storage node that holds the file. The requesting node and the node that holds the file use a Needham-Schroeder type authentication protocol, such as Kerberos, to establish trusted communications. After authentication, the node that has the file sends the file to the requesting node. The requesting node then decrypts the file using $K_{PRIVi}$, and provides the decrypted file to the user.

If the user modifies the retrieved file, the storage node uses the latest $K_{PUBi}$ provided by the storage coordinator to encrypt the file. The storage node then sends the encrypted file to the appropriate node after authentication has taken place. If the storage node's authentication has expired, the storage node requests that the storage coordinator again acts as a third-party trusted server for authentication of the node with the node to which the file must be sent. After authentication, the node then sends the encrypted file.

Replication Groups with Authentication

The nodes participating in a replication group may also be required to establish trusted communication with each other before replicating. Thus, the respective nodes in the group contact the storage coordinator to act as the third-party trusted server.

IX. File Locking

The PSN employs file locking in public lockers to control concurrent access to files stored in the PSN. In private lockers file locking is not required because, based on system policy, only one user can access files in a given private locker at any one time.

For the public lockers, the storage coordinators maintain locks on files based on requests made by users for either read or write access to the files. When a user attempts to open a file in the public locker, storage node requests access to the file by contacting the storage coordinator and requesting access. The level of access requested is based on how the client accesses the file. Typically, two parameters are used, one specifying the file access method and the other specifying if the file can be shared or not. If the file is not available for the requested level of access, the storage coordinator rejects the request. The storage node then returns an appropriate error message to the user.

If the file is available, the storage coordinator tracks the status of the file so that the storage coordinator can handle other concurrent requests from users of the public locker. The storage coordinator thus places a lock on the file by notation in the appropriate locker management table. The storage coordinator also returns a success message to the storage node and includes in the message a token that is unique to the transaction and/or to the user. The token identifies the file lock in all subsequent calls from the user to the storage coordinator in relation to the locked file.

When the storage coordinator is a member of a cluster of storage coordinators, the storage coordinator must coordinate with the other member of the cluster, to ensure that a requested file is not then in use by a user who is communicating with another of the storage coordinators.

The file access control used by the PSN is similar to the access control used in windows NT to ensure compatibility with all client applications.

In summary, the peer storage network provides a centrally managed and administered system that uses storage resources that are distributed over an underlying corporate network. The storage resources are under-utilized storage capacity on, for example, hard disks of the personal computers that are connected to the network. The system is set up as replication groups, which perform file replication operations that eliminate the need for daily back-up operations of the system. Further, the system maintains versions of files such that a user, without the intervention of IT personnel, can readily recover a last file.

With centralized administration of the system, the system administrator can readily oversee the operations of the entire system. Further, the system administrator can set policies that effect all or portions of the system through an administrative console that communicates with the storage coordinator, which enforces the policies.

The system is readily scalable by the addition of storage nodes and/or storage coordinators. As appropriate, the system administrator can readily set new policies for the additions to the network.

Various authentication protocols incorporated into the system, as well as access policies and file encryption policies applicable to various types of files, ensure that the network is secure and that storage lockers and individual files are protected from unauthorized users. The system administrator may, at any time, change access privileges through the administrative console. The changes to the access privileges are then enforced by the storage coordinator by, for example, changing the encryption keys associated with a locker or files contained in the locker.

The system performs its replication operations using an XML message based protocol that efficiently utilizes available network bandwidth by communicating using the UDP/IP protocol. The replication operations run as background transactions, which are transparent to the user. The system further utilizes a synchronization process that ensures that the nodes in the storage group each have synchronized copies of the group files.

The system thus operates efficiently in a business environment, and has relatively low overhead when compared to other file storage systems for business environments.

What is claimed is:

1. A distributed network storage system including
a network of devices with dedicated storage media, some or all of the devices including unused storage capacity;
a storage coordinator that manages storage of network files on the unused storage capacity of the dedicated storage media, the storage coordinator designating selected groups of nodes within the plurality of nodes and directing the nodes in a given group to communicate peer-to-peer to replicate associated group files and to store the replicated files on the storage media utilizing the otherwise unused storage capacity at the respective nodes;
an administrative console that administers policies set by a system administrator, the administrative console providing policies to the storage coordinator and setting policies that determine a predetermined minimum number of storage nodes in the group; and
the storage coordinator designating the groups in accordance with the policies provided by the administrative console, the storage coordinator selecting at least the predetermined minimum number of nodes for each of the respective groups.

2. The storage system of claim 1 wherein
the administrative console provides to the storage coordinator policies that determine the locations of at least one of the nodes in a group relative to the other nodes in the group, and
the storage coordinator selects the nodes for the respective groups in accordance with the applicable policies concerning location.

3. The storage system of claim 1 in which the storage coordinator is a member of a cluster of storage coordinators that communicate peer-to-peer and share the managing of the file storage on the plurality of file storage nodes.

4. The storage system of claim 1 further including
a plurality of remote file storage nodes that communicate peer-to-peer over the network;
a remote storage coordinator that manages file storage on the plurality of remote file storage nodes, the storage coordinator designating selected groups of nodes within the plurality of remote file storage nodes and directing the nodes in a given group to communicate peer-to-peer to replicate associated group files; and
the administrative console providing policies to the remote storage coordinator that govern the operations of the remote storage coordinator.

5. The system of claim 4 wherein the storage coordinator and the remote storage coordinator respectively designate groups that include both file storage nodes and remote file storage nodes.

6. The system of claim 1 wherein the storage coordinator manages distributed searches of files stored in the system by designating a selected node from each group to search through the respective group files, the storage coordinator accumulating the search results from the selected nodes and providing the results to a requesting node.

7. The system of claim 6 wherein the storage coordinator further designates selected nodes that are near neighbors of the requesting node to supply to the requesting node one or more files requested from the search results.

8. The system of claim 1 wherein
the administrative console provides policies for access to various types of files; and
the storage coordinator creates different types of storage lockers for files associated with different access policies and assigns all or portions of a given storage locker to one or more of the selected groups of nodes.

9. The storage system of claim 8 wherein the administrative console provides policies for the different types of lockers, and the storage coordinator manages the respective locker in accordance with the policies.

10. The storage system of claim 8 wherein the storage coordinator maintains file allocation tables for the respective lockers.

11. The storage system of claim 10 wherein the nodes compress the files before replicating the files.

12. The storage system of claim 10 wherein the nodes provide entries for the respective file allocation tables, the entries including links to the physical location of the respective files.

13. The storage system of claim 12 wherein a given table entry includes a file Id that consists of a storage group Id, a node Id and an associated message number.

14. The storage system of claim 1 wherein the administrative console provides to the storage coordinator replication operation policies that relate to one or more of time constraints, interval constraints, and bandwidth constraints, and
the storage coordinator manages the replication operations in accordance with the provided policies.

15. The storage system of claim 14 wherein a given node performs the replication operation by segmenting a given file into segments and sending a series of numbered messages that contain file segments to the other nodes in the associated group.

16. A distributed network storage system including
a plurality of file storage nodes that are distributed on and communicate peer-to-peer over the network;
a storage coordinator that manages file storage on the plurality of files storage nodes, the storage coordinator designating selected groups of nodes within the plurality of file storage nodes and directing the nodes in a given group to communicate peer-to-peer to replicate associated group files;
a plurality of remote file storage nodes that communicate peer-to-peer over the network;
a remote storage coordinator that manages file storage on the plurality of remote file storage nodes, the storage coordinator designating selected groups of nodes within the plurality of remote file storage nodes and directing the nodes in a given group to communicate peer-to-peer to replicate associated group files;
an administrative console that administers policies set by a system administrator;
the administrative console providing policies to the storage coordinator;
the storage coordinator designating the groups in accordance with the policies provided by the administrative console; and
the administrative console providing policies to the remote storage coordinator that govern the operations of the remote storage coordinator.

17. The system of claim 16 wherein the nodes designated as members of a group reserve storage capacity to store the associated group files.

18. The storage system of claim 16 wherein
the administrative console sets policies that determine a predetermined minimum number of storage nodes in the group; and
the storage coordinator selects at least the predetermined minimum number of nodes for each of the respective groups.

19. The storage system of claim 16 wherein
the administrative console provides to the storage coordinator policies that determine the locations of at least one of the nodes in a group relative to the other nodes in the group, and
the storage coordinator selects the nodes for the respective groups in accordance with the applicable policies concerning location.

20. The storage system of claim 16 in which the storage coordinator is a member of a cluster of storage coordinators that communicate peer-to-peer and share the managing of the file storage on the plurality of file storage nodes.

21. The system of claim 16 wherein the storage coordinator and the remote storage coordinator respectively designate groups that include both file storage nodes and remote file storage nodes.

22. The system of claim 16 wherein the storage coordinator manages distributed searches of files stored in the system by designating a selected node from each group to search through the respective group files, the storage coordinator accumulating the search results from the selected nodes and providing the results to a requesting node.

23. The system of claim 22 wherein the storage coordinator further designates selected nodes that are near neighbors of the requesting node to supply to the requesting node one or more files requested from the search results.

24. The system of claim 16 wherein
the administrative console provides policies for access to various types of files; and
the storage coordinator creates different types of storage lockers for files associated with different access policies and assigns all or portions of a given storage locker to one or more of the selected groups of nodes.

25. The storage system of claim 24 wherein the administrative console provides policies for the different types of lockers, and the storage coordinator manages the respective locker in accordance with the policies.

26. The storage system of claim 24 wherein the storage coordinator maintains file allocation tables for the respective lockers.

27. The storage system of claim 26 wherein the nodes provide entries for the respective file allocation tables, the entries including links to the physical location of the respective files.

28. The storage system of claim 27 wherein a given table entry includes a file Id that consists of a storage group Id, a node Id and an associated message number.

29. The storage system of claim 26 wherein the nodes compress the files before replicating the files.

30. The storage system of claim 29 wherein the nodes encrypt the files before compressing the files.

31. The storage system of claim 16 wherein the administrative console provides to the storage coordinator replication operation policies that relate to one or more of time constraints, interval constraints, and bandwidth constraints, and
the storage coordinator manages the replication operations in accordance with the provided policies.

32. The storage system of claim 31 wherein a given node performs the replication operation by segmenting a given file into segments and sending a series of numbered messages that contain file segments to the other nodes in the associated group.

* * * * *